(12) United States Patent
Saito

(10) Patent No.: US 11,747,623 B2
(45) Date of Patent: Sep. 5, 2023

(54) DISPLAY DEVICE AND OPTICAL UNIT

(71) Applicant: SEIKO EPSON CORPORATION, Tokyo (JP)

(72) Inventor: Atsushi Saito, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 150 days.

(21) Appl. No.: 17/211,879

(22) Filed: Mar. 25, 2021

(65) Prior Publication Data
US 2021/0302740 A1 Sep. 30, 2021

(30) Foreign Application Priority Data

Mar. 26, 2020 (JP) ................... 2020-055571

(51) Int. Cl.
*G02B 27/01* (2006.01)
(52) U.S. Cl.
CPC .. *G02B 27/0172* (2013.01); *G02B 2027/0174* (2013.01); *G02B 2027/0178* (2013.01)
(58) Field of Classification Search
CPC ................................................. G02B 27/0172
See application file for complete search history.

(56) References Cited

U.S. PATENT DOCUMENTS

| | | | |
|---|---|---|---|
| 2009/0040580 A1 | 2/2009 | Mukawa | |
| 2014/0204438 A1 | 7/2014 | Yamada et al. | |
| 2015/0062715 A1* | 3/2015 | Yamada | G02B 27/0172 359/630 |
| 2016/0252742 A1 | 9/2016 | Wakabayashi | |
| 2017/0261751 A1 | 9/2017 | Noguchi et al. | |
| 2019/0235266 A1 | 8/2019 | Ide et al. | |

FOREIGN PATENT DOCUMENTS

| CN | 105929535 | 9/2016 |
|---|---|---|
| JP | 2006-350129 | 12/2006 |
| JP | 2014-142386 | 8/2014 |
| JP | 2014-224846 | 12/2014 |
| JP | 2015-049278 | 3/2015 |
| JP | 2017-167181 | 9/2017 |
| JP | 2019-133132 | 8/2019 |

* cited by examiner

*Primary Examiner* — Edmond C Lau
(74) *Attorney, Agent, or Firm* — JCIPRNET

(57) ABSTRACT

A display device includes an image light generating device, a light-guiding member on which image light emitted from the image light generating device is incident, a first diffraction element provided at an incident side of the light-guiding member and having positive power, a second diffraction element provided at an exit side of the light-guiding member and having positive power, and a mirror provided at an end portion at the incident side of the light-guiding member and having positive power, in which the image light passed through the first diffraction element is reflected by the mirror and propagates in the light-guiding member, and the image light incident on the second diffraction element is deflected by the second diffraction element forming an exit pupil.

6 Claims, 4 Drawing Sheets

DISPLAY DEVICE AND OPTICAL UNIT

The present application is based on, and claims priority from JP Application Serial Number 2020-055571, filed Mar. 26, 2020, the disclosure of which is hereby incorporated by reference herein in its entirety.

BACKGROUND

1. Technical Field

The present disclosure relates to a display device and an optical unit provided with diffraction elements on an incident side and an exit side of a light-guiding member.

2. Related Art

As a display device such as a head-mounted display, a display device provided with diffraction elements on an incident side and an exit side of a light-guiding member and with a planar mirror on one end or both ends of the light-guiding member to adjust an incident angle of image light on the diffraction element and an exit angle of the image light from the diffraction element to enhance the flexibility in setting the inclination of the image light in an incident direction and in an exit direction is known (JP-A-2014-142386).

In the display device, it is desirable to add a mirror or another optical member having positive power in order to suppress luminance unevenness of an image, but the addition of such an optical member may increase the size of the optical system.

SUMMARY

A display device according to one aspect of the present disclosure includes an image light generating device, a light-guiding member on which image light emitted from the image light generating device is incident, a first diffraction element provided at an incident side of the light-guiding member and having positive power, a second diffraction element provided at an exit side of the light-guiding member and having positive power, and a mirror provided at an end portion at the incident side of the light-guiding member and having positive power, in which the image light that passed through the first diffraction element is reflected by the mirror and propagates in the light-guiding member, and the image light incident on the second diffraction element is deflected by the second diffraction element forming an exit pupil.

DESCRIPTION OF EXEMPLARY EMBODIMENTS

Figure 1:
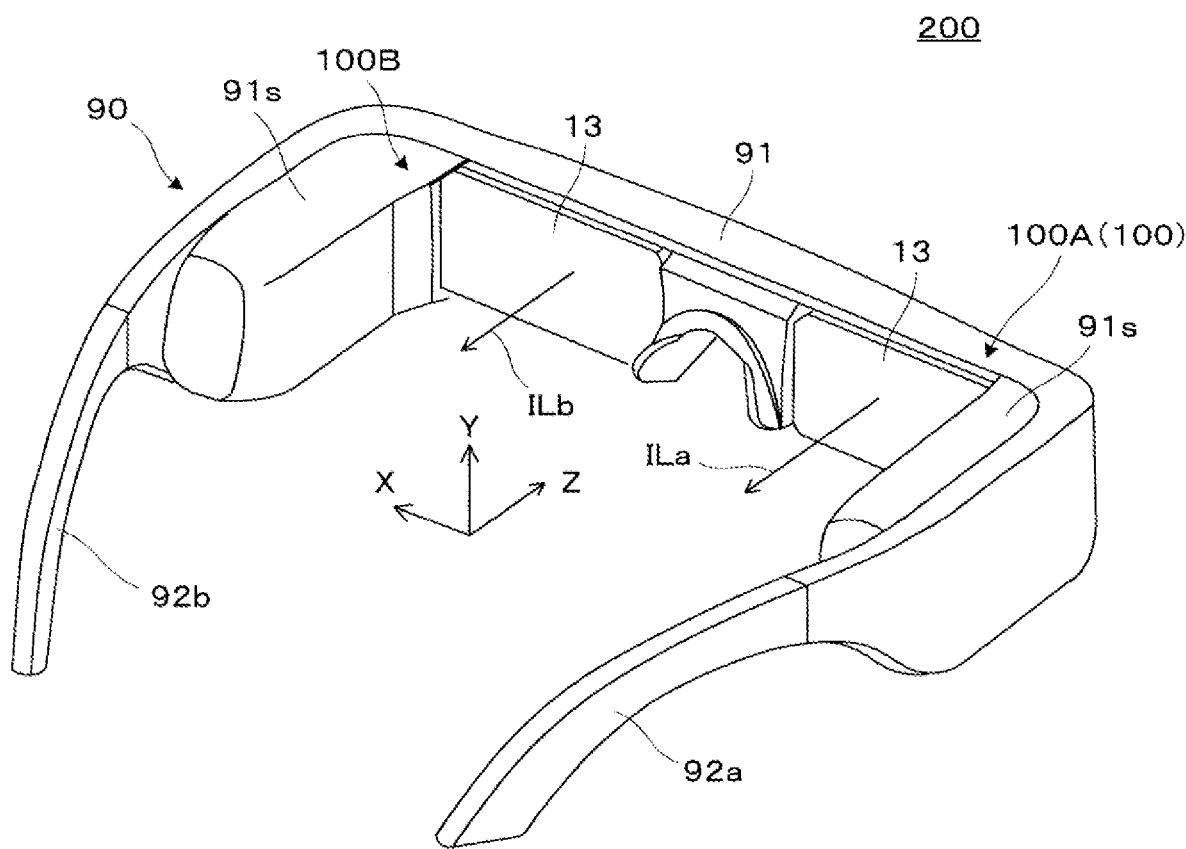
FIG. 1 is a perspective view illustrating an appearance of a display device according to an embodiment.
Figure 2:
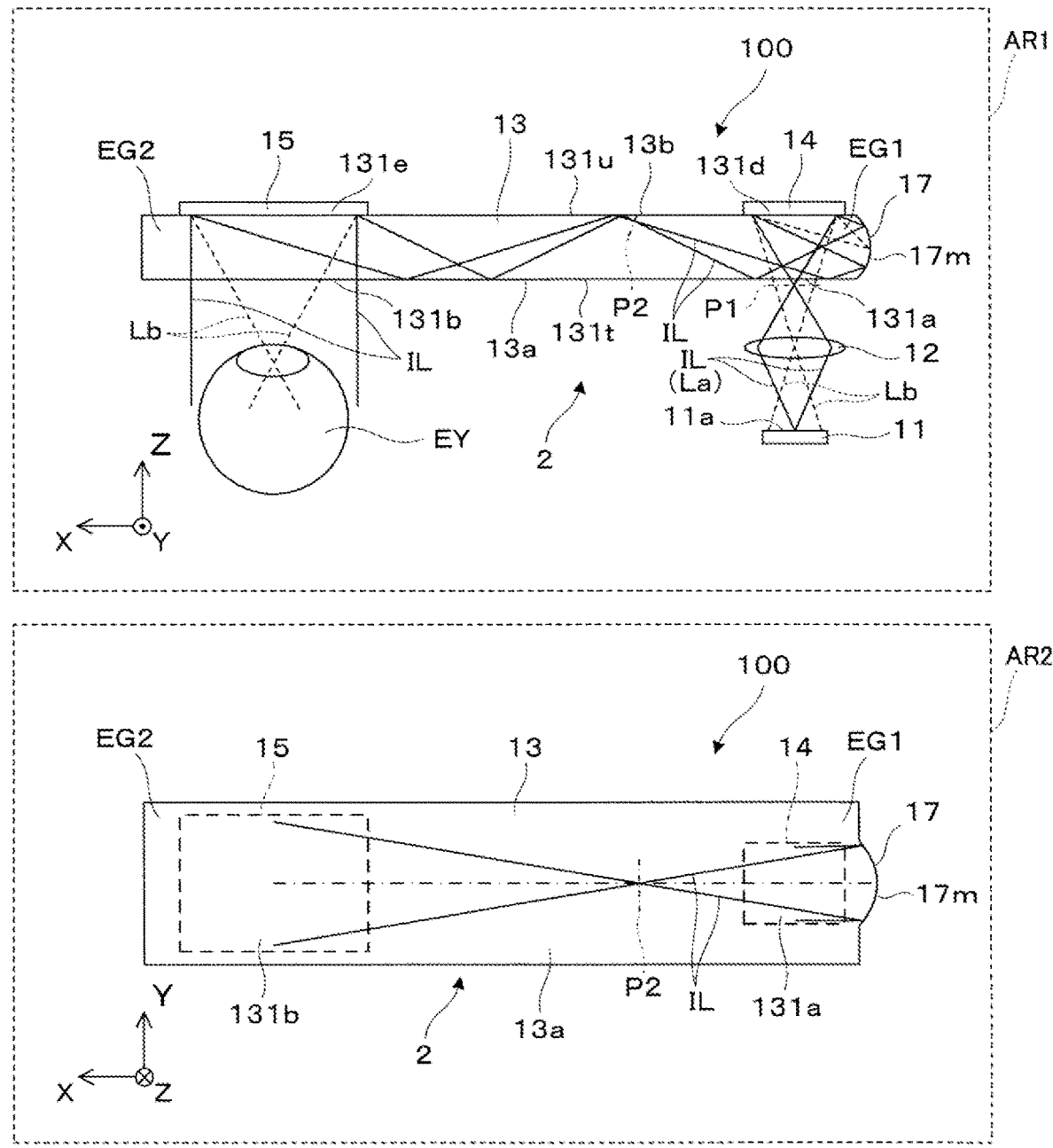
FIG. 2 is a schematic plan sectional view and a back view illustrating an optical system of the display device.

FIG. 1 is a perspective view illustrating an appearance of a head-mounted display (hereafter, also referred to as HMD) 200 including a display device according to an embodiment of the present disclosure. FIG. 2 is a schematic plan sectional view and a back view illustrating an optical system of the display device 100 illustrated in FIG. 1. In FIG. 1 and the like, X, Y, and Z are an orthogonal coordinate system, a +X direction corresponds to a lateral direction in which both eyes EY of an observer or a wearer wearing the display device 100 are aligned, a +Y direction corresponds to an upward direction orthogonal to the lateral direction in which both eyes EY of the observer are aligned, and a +Z direction corresponds to a front direction of the observer or a front surface direction.

The HMD 200 illustrated in FIG. 1 has a first display device 100A causing image light ILa to be incident on the right eye and a second display device 100B causing image light ILb to be incident on the left eye. For example, the HMD 200 is configured in a shape like glasses. Specifically, the HMD 200 further includes a frame 90 that holds the first display device 100a for the right eye and the second display device 100b for the left eye. The HMD 200 is mounted on a head of the observer by the frame 90.

The HMD 200 includes, as the frame 90, a main body 91, a temple 92a provided at right side of the main body 91 and supported on a right ear of the observer, and a temple 92b provided at left side of the main body 91 and supported on a left ear of the observer. The main body 91 has case-shaped storage portions 91s on both side portions thereof, and the optical system described later, electronic components causing the optical system to perform a display operation, and other various components are housed in the storage portions 91s.

The display device 100A for the right eye and the display device 100B for the left eye are arranged with the right and left sides reversed, and the display device 100A for the right eye will be described below as a representative of the display device 100. In the present specification, the HMD 200 in which a pair of the display devices 100A and 100B are combined may be referred to as a display device.

With reference to FIG. 2, a basic configuration of the optical system of the display device 100 will be explained. In FIG. 2, a first region AR1 is a schematic plan sectional view explaining the optical system of the display device 100, and a second region AR2 is a back view explaining the optical system of the display device 100. The display device 100 includes an image light generating device 11, a projection optical system 12, a light-guiding member 13, a first diffraction element 14, a second diffraction element 15, and a mirror 17. Of these, the projection optical system 12, the light-guiding member 13, the first diffraction element 14, the second diffraction element 15, and the mirror 17, which are the parts excluding the image light generating device 11, constitute an optical unit 2 displaying a virtual image according to a display operation of the image light generating device 11. In the optical unit 2, the first diffraction element 14 is provided at an incident side of the light-guiding member 13, and the second diffraction element 15 is provided at an exit side of the light-guiding member 13. The mirror 17 is provided at a first end EG1 side, which is an end portion on the incident side of the light-guiding member 13.

The image light generating device 11 is a self-luminous type display device which employs, for example, organic EL (Organic Electro-Luminescence) and forms a still image or a moving image in color on a two-dimensional display surface 11a. The image light generating device 11 is driven by a display control circuit which is not illustrated to perform the display operation. By configuring the image light generating device 11 with an organic EL, a small-sized display device 100 capable of displaying a high-quality image can be achieved. Further, although not illustrated, a configuration may be adopted where the image light generating device 11 includes an illumination light source and a display panel such as a liquid crystal display element that modulates illumination light emitted from the illumination light source.

In a case of the present embodiment, the image light generating device 11 has a single-color display panel and performs single-color display. A configuration may be adopted where the image light generating device 11 modulates laser light using a micro-mirror device.

The projection optical system 12 is provided on the optical path of the image light IL between the image light generating device 11 and the light-guiding member 13, and has positive power. The projection optical system 12 guides the image light IL emitted from the image light generating device 11 to the light-guiding member 13. The projection optical system 12 may include various lenses such as a spherical lens and a free curved surface lens. In the example illustrated in FIG. 2, the projection optical system 12 has one lens, but the number of lenses constituting the projection optical system 12 is not limited thereto. The projection optical system 12 may include two or more lenses. Further, a plurality of lenses may be joined together and integrated, and the projection optical system 12 may be constituted of the integrated lens. The projection optical system 12 may be constituted by, for example, an optical element such as a prism other than the lens.

The image light generating device 11 and the projection optical system 12 are arranged at the observer side of the light-guiding member 13. In this case, the image light generating device 11 and the like are arranged so as not to affect the appearance, and it becomes easy to prevent the design of the display device 100 from being impaired.

The light-guiding member 13 guides the image light IL emitted from the projection optical system 12 while totally reflecting the image light IL, and then emits the image light IL toward the observer's eye EY. The light-guiding member 13 is a plate-shaped member and has a first surface 13a facing the observer and the image light generating device 11 and a second surface 13b facing the outside. The first surface 13a and the second surface 13b are plane surfaces and extend parallel to each other. By forming the light-guiding member 13 into a flat plate shape, the light-guiding member 13 can be formed of flat plate glass or flat plate resin, and thus the light-guiding member 13 and the optical unit 2 can be easily manufactured.

In the first surface 13a, a region facing the image light generating device 11 or the projection optical system 12 is an incident surface 131a on which the image light IL emitted from the image light generating device 11 is incident. The incident surface 131a is a plane optical surface. In this embodiment, the incident surface 131a functions as a total reflection surface 131t and there are cases where it is desirable not to form an AR coating. Further, a region facing the observer's eye EY is an exit surface 131b that emits the image light IL toward the eye EY. Similar to the incident surface 131a, the exit surface 131b is also a plane optical surface. In this embodiment, the exit surface 131b does not function as the total reflection surface 131t and the AR coating having desired properties can be formed relatively freely. A portion between the incident surface 131a and the exit surface 131b functions as the total reflection surface 131t.

Of the second surface 13b formed on the external side of the light-guiding member 13, the first diffraction element 14 is provided on an outer surface 131d facing the incident surface 131a with a main body or a base material of the light-guiding member 13 interposed therebetween. That is, the first diffraction element 14 is arranged at the external side of the light-guiding member 13 and at the first end EG1 or at a position close to the first end EG1. Of the second surface 13b, the second diffraction element 15 is provided on an outer surface 131e facing the exit surface 131b with the main body or the base material of the light-guiding member 13 interposed therebetween. That is, the second diffraction element 15 is arranged at the external side of the light-guiding member 13 and at a second end EG2 or at a position close to the second end EG2. Each of the first diffraction element 14 and the second diffraction element 15 is constituted of a reflection-type volume hologram. A portion between a pair of outer surfaces 131d and 131e functions as a total reflection surface 131u. Configurations of the first diffraction element 14 and the second diffraction element 15 will be described later.

The mirror 17 reflects the image light IL that has passed through the first diffraction element 14 and propagates the image light IL in the light-guiding member 13. The mirror 17 has a concave surface that performs an internal reflection and has positive power, and is constituted of a curved surface convex outward in appearance. The outside of the mirror 17 is coated with a mirror layer 17m. The mirror layer 17m is made of a metal film or a dielectric multilayer film. In this case, a reflective film made of a single-layer film or a multilayer film formed from, for example, a metal such as Al or Ag is formed on the base material of the light-guiding member 13 by vapor deposition or the like. The mirror 17 is formed, for example, separately from the light-guiding member 13 by joining a mirror component made of a base material having the same refractive index to the first end EG1 of the light-guiding member 13. However, the mirror 17 can be made of the same base material as the light-guiding member 13 as a member integrated with the light-guiding member 13.

As optical elements that directly contribute to an image formation, the display device 100 according to the present embodiment includes the projection optical system 12 having positive power, the first diffraction element 14 having positive power, the mirror 17 having positive power, and the second diffraction element 15 having positive power which are arranged in order along the optical path of the image light IL. Focusing on propagation of the image light IL in the optical system of the display device 100, the image light generating device 11 emits the image light IL toward the projection optical system 12. The projection optical system 12 emits the image light IL incident thereon toward the first diffraction element 14. The first diffraction element 14 diffracts the image light IL incident thereon from the incident surface 131a of the light-guiding member 13 toward the mirror 17 in an oblique direction. The mirror 17 reflects the image light IL incident thereon toward inside of the incident surface 131a of the total reflection surface 131t. The image light IL reflected inside the incident surface 131a of the total reflection surface 131t is reflected by the total reflection surface 131u or the like on the opposite side and is incident on the second diffraction element 15. The second diffraction element 15 emits the image light IL incident thereon from an oblique direction toward the observer's eye EY from the exit surface 131b of the light-guiding member 13.

In the above-described optical system, a first intermediate image P1 of the image light IL is formed between the projection optical system 12 and the first diffraction element 14, a second intermediate image P2 of the image light IL is formed between the mirror 17 and the second diffraction element 15, and an exit pupil is formed by the second diffraction element 15.

Figure 3:
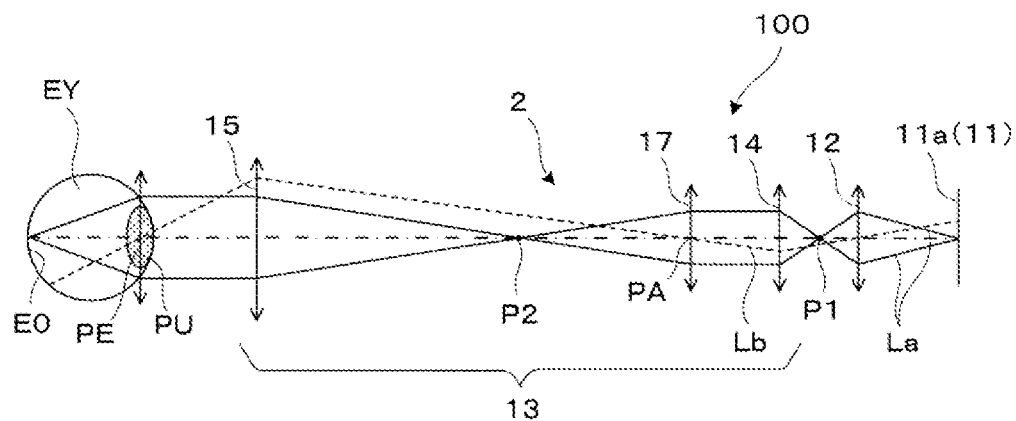
FIG. 3 is a ray diagram to explain an action of the optical system.

FIG. 3 illustrates a ray diagram of the display device 100. In FIG. 3, each optical element arranged along an optical axis is indicated by an arrow extending vertically. Further, a light beam emitted from one pixel (on the optical axis in the illustrated example) of the image light generating device 11 is indicated by a solid line La, a main light beam emitted from an end portion region of the image light generating device 11 is indicated by a dotted line Lb. In FIG. 3, all optical units are illustrated as a transmissive-type unit for simplification of the figure.

In the display device 100, the image light IL passed through the first diffraction element 14 is reflected by the mirror 17 and propagates in the light-guiding member 13, and the image light IL incident on the second diffraction element 15 is deflected by the second diffraction element 15 forming an exit pupil PE. Here, the first intermediate image P1 of the image light IL is formed between the projection optical system 12 and the first diffraction element 14, an opening or a pupil PA is formed in the vicinity of the diffraction element 14 and between the first diffraction element 14 and the second diffraction element 15, the second intermediate image P2 of the image light IL is formed between the mirror 17 and the second diffraction element 15, and the exit pupil PE is formed by the second diffraction element 15. Although detailed description is omitted, the first diffraction element 14 and the second diffraction element 15 are arranged at conjugate positions. As described above, the second intermediate image P2 and the pupil PA are formed between the first diffraction element 14 and the second diffraction element 15. Therefore, positions of the both diffraction elements 14 and 15 on which the light beam is incident can be controlled to perform wavelength compensation appropriately, and it is possible to prevent the light-guiding plate from being thick and the second diffraction element 15 from being too large due to the light spreading.

According to the optical system of the display device 100, three conditions described below are satisfied. A first condition is that a light beam emitted from one point of the image light generating device 11 forms an image as one point in a retina E0. A second condition is that an incident pupil of the optical system of the display device 100 and the exit pupil PE that is premised on the arrangement of the pupil of an eyeball are conjugated. A third condition is that the first diffraction element 14 and the second diffraction element 15 are in a conjugate relationship.

More specifically, as understood from the solid line La illustrated in FIG. 3, by satisfying the first condition of that a light beam emitted from one point of the image light generating device 11 forms an image as one point in a retina E0, the observer can visibly recognize one pixel. Further, as understood from the dotted line Lb illustrated in FIG. 3, by satisfying the second condition of that an incident pupil of the optical system of the display device 100 and the exit pupil PE corresponding to the arrangement of the eye EY are in a conjugate (conjugation of the pupil) arrangement relationship, the entire region of the image generated by the image light generating device 11 can be visually recognized.

Further, by adjusting the arrangement and the power of the mirror 17, the third condition that the first diffraction element 14 and the second diffraction element 15 are in a conjugate relationship can be satisfied. Therefore, the light beam can be made incident on positions corresponding to an interference fringe described later in the first diffraction element 14 and the second diffraction element 15, and thus the wavelength compensation can be appropriately performed for wavelength dispersion. As a result, deterioration in resolution of image light IL can be suppressed to be small.

Figure 4:
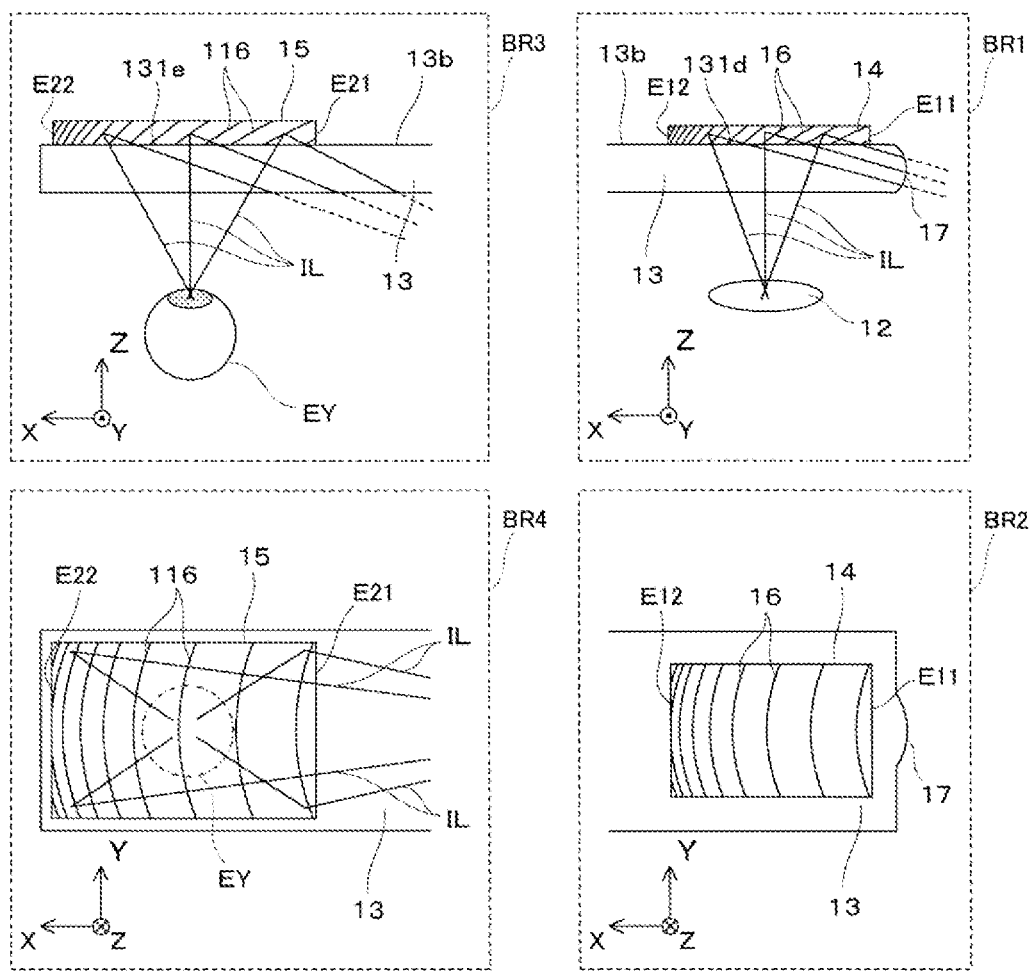
FIG. 4 illustrates a cross-sectional view and a back view of a first diffraction element and a cross-sectional view and a back view of a second diffraction element.

Hereinafter, with reference to FIG. 4, the configurations of the first diffraction element 14 and the second diffraction element 15 will be explained and the wavelength compensation will be explained. In FIG. 4, a first region BR1 is a cross-sectional view of the first diffraction element 14, a second region BR2 is a back view of the first diffraction element 14 from the observer side, a third region BR3 is a cross-sectional view of the second diffraction element 15, and a fourth region BR4 is a back view of the second diffraction element 15 from the observer side.

The first diffraction element 14 illustrated in the first region BR1 and the second region BR2 is a diffraction optical element constituted of a reflection-type first volume hologram. The first diffraction element 14 includes an interference fringe 16 having a pitch corresponding to a specific wavelength. The interference fringe 16 is recorded on a holographic photosensitive layer as regions each having a different refractive index and formed in stripes. The interference fringe 16 is inclined in one direction with respect to the second surface 13b of the light-guiding member 13 so as to correspond to a specific exit angle. In a case of the present embodiment, the interference fringe 16 is inclined in a direction from the lower left to the upper right of a page of the first region BR1 in FIG. 4. This allows the first diffraction element 14 to diffract and deflect the image light IL in a predetermined direction to guide the image light IL to the mirror 17. The specific wavelength and the specific exit angle respectively correspond to a wavelength and an exit angle of the image light IL. The interference fringe 16 can be formed, for example, by performing an interference exposure on the holographic photosensitive layer by using reference light of a plane wave and object light of a spherical wave. Note that, the interference fringe 16 is enlarged to be displayed and the intervals therebetween are thinned out for easy understanding.

In the first diffraction element 14, the pitch and the inclination of the interference fringe 16 continuously change from one end to the other end of the first diffraction element 14 in a cross-sectional view of the first volume hologram. More specifically, the pitches of the an interference fringe 16 is relatively large at a first end portion E11 on closer side to the mirror 17, and relatively small at a second end portion E12 on farther side from the mirror 17, and the pitches gradually decrease from the first end portion E11 toward the second end portion E12. In other words, the density of the an interference fringe 16 changes from rough to dense from the first end portion E11 to the second end portion E12. As a result, an exit direction of the image light IL can be inclined with respect to an incident direction of the image light IL while imparting the first diffraction element 14 desired positive power. Note that, the cross-sectional view of the first volume hologram or the first diffraction element 14 means that a cross-section of the first volume hologram when cut along the XZ plane, that is, a horizontal plane when the observer is wearing the display device 100 is viewed.

Further, the inclination of the interference fringe 16 with respect to the second surface 13b is relatively small at the first end portion E11 on closer side to the mirror 17, and relatively large at the second end portion E12 on farther side from the mirror 17, and the inclinations gradually increase from the first end portion E11 toward the second end portion E12.

In a back view of the first volume hologram of the first diffraction element 14, the interference fringe 16 is formed in substantially concentric circular shapes having a center on the outside of the first diffraction element 14. The pattern of the interference fringe 16 seen from behind the first diffraction element 14 is in arc shapes. Further, in the first diffraction element 14, the radius of curvature of the interference fringe 16 continuously changes from one end to the other end of the first diffraction element 14 in the back view of the first volume hologram. More specifically, the radius of curvature of the interference fringe 16 gradually increases from the first end portion E11 to the second end portion E12. Therefore, the light beam spreading in the ±Y direction about the optical axis from the projection optical system 12 can be efficiently emitted to a direction of the inclined mirror 17 with little unevenness. Note that, the back view of the first volume hologram or the first diffraction element 14 means that the first volume hologram is viewed from a direction along the Z axis, that is, a direction of the observer's eye EY when the observer is wearing the display device 100.

The second diffraction element 15 illustrated in the third region BR3 and the fourth region BR4 is a partial reflection-type diffraction optical element constituted of a reflection-type second volume hologram. Therefore, in addition to the image light IL, external light is incident on the eye EY via the second diffraction element 15, and thus the observer can recognize an image in which the image light IL generated by the image light generating device 11 and the external light (a background) are superimposed on each other.

The second diffraction element 15 includes an interference fringe 116 having a pitch corresponding to a specific wavelength. The an interference fringe 116 is recorded on a holographic photosensitive layer as regions each having a different refractive index and formed in stripes. The interference fringe 116 is inclined in one direction with respect to the second surface 13b of the light-guiding member 13 so as to correspond to a specific incident angle. In a case of the present embodiment, the an interference fringe 116 is inclined in a direction from the lower left to the upper right of a page of the third region BR3 in FIG. 4. This allows the second diffraction element 15 to diffract and deflect the image light IL in a predetermined direction to guide the image light IL to the observer's eye EY. The specific wavelength and the specific incident angle respectively correspond to the wavelength and an incident angle of the image light IL. The interference fringe 116 can be formed, for example, by performing the interference exposure on the holographic photosensitive layer by using reference light of a plane wave and object light of a spherical wave.

In the second diffraction element 15, the pitch and the inclination of the interference fringe 116 continuously change from one end to the other end of the second diffraction element 15 in a cross-sectional view of the second volume hologram. More specifically, the pitch of the interference fringe 116 is relatively large at an incident side of the image light IL, that is, at a first end portion E21 on closer side to the first diffraction element 14 or the mirror 17, and relatively small at a second end portion E22 on farther side from the first diffraction element 14, and the pitch gradually decreases from the first end portion E21 toward the second end portion E22. In other words, the density of the interference fringe 116 changes from rough to dense from the first end portion E21 to the second end portion E22. As a result, an exit direction of the image light IL can be inclined with respect to an incident direction of the image light IL while imparting the second diffraction element 15 desired positive power.

Further, the inclinations of the interference fringe 116 with respect to the second surface 13b are relatively small at the first end portion E21 on closer side to the first diffraction element 14 or the mirror 17, and relatively large at the second end portion E22 on farther side from the first diffraction element 14, and the inclinations gradually increase from the first end portion E21 toward the second end portion E22.

In a back view of the second volume hologram of the second diffraction element 15, the interference fringe 116 is formed in substantially concentric circular shapes having a center on the outside of the second diffraction element 15. The patterns of the interference fringe 116 seen from behind the second diffraction element 15 is in an arc shape. Further, in the second diffraction element 15, the radius of curvature of the interference fringe 116 continuously changes from one end to the other end of the second diffraction element 15 in the back view of the second volume hologram. More specifically, the radius of curvature of the interference fringe 116 gradually increase from the first end portion E21 to the second end portion E22. For this reason, an exit pupil narrowed to be small is formed even for the light beam that forms an angle of view spreading in the ±Y direction, and thus the luminance unevenness of the image is unlikely to occur.

As described above, in the display device 100 of the present embodiment, the first diffraction element 14 and the second diffraction element 15 are constituted of the same volume holograms.

From the first diffraction element 14, the light beam incident on the light-guiding member 13 is obliquely emitted toward the mirror 17 with a large exit angle. Similarly, the light beam propagated by the light-guiding member 13 is obliquely incident on the second diffraction element 15 with a large incident angle. Therefore, in the first diffraction element 14, the light beams from the interference fringe 16 on the second end portion E12 side far from the mirror 17 transmit through the adjacent interference fringe 16 on the first end portion E11 side. Further, in the second diffraction element 15, the light beams transmitted through the adjacent interference fringe 116 on the first end portion E21 side are incident on the interference fringe 116 on the second end portion E22 side far from the first diffraction element 14. In this case, if the first diffraction element 14 and the second diffraction element 15 are constituted of conventional diffraction elements having a constant pitch of an interference fringe, in the light beams incident on the first diffraction element 14 and the second diffraction element 15, amounts of light reflected on the first end portions E11 and E21 sides increase and amounts of light reflected on the second end portions E12 and E22 sides decrease. As a result, luminance unevenness of the image is likely to occur.

On the other hand, in the display device 100 of the present embodiment, the first diffraction element 14 and the second diffraction element 15 have the interference fringes 16 and 116 that follow Bragg's law as much as possible for all the light beams forming an angle of view, and the first diffraction element 14 and the second diffraction element 15 have configurations in which both the pitches and the inclinations of the interference fringes 16 and 116 continuously change from one end to the other end. Further, since the pitches of the interference fringes 16 and 116 gradually decrease from the first end portions E11 and E21 toward the second end portions E12 and E22. Therefore, comparing with a case where the conventional diffraction element is used, the amounts of light reflected on the first end portions E11 and E21 sides and the amounts of light reflected on the second end portions E12 and E22 sides tend to be equal. As a result, by using the first diffraction element 14 and the second diffraction element 15 as described above, the luminance unevenness of the image is less likely to occur.

In the display device 100 of the above-described embodiment, a function of correcting the image light IL can be imparted to the mirror 17 arranged between the first diffraction element 14 and the second diffraction element 15 on the optical path. Since the mirror 17 is provided at the end portion at the incident side of the light-guiding member 13, it is possible to suppress an increase in a thickness of the light-guiding member 13, and thus the light-guiding member 13 can be easily made into a flat plate shape.

Modification Examples and Others

The present disclosure is described according to the above-mentioned exemplary embodiments, but the present disclosure is not limited to the above-mentioned exemplary embodiments. The present disclosure may be carried out in various modes without departing from the gist of the present disclosure, and, for example, the following modifications may be carried out.

The first diffraction element 14 and the second diffraction element 15 are not limited to those formed for a single-color display, but may be formed for a multicolor display. In this case, for example, a structure in which three layers of diffraction elements corresponding to three colors of RGB are laminated can be used. Further, three kinds of interference fringe corresponding to each diffraction of the RGB can be formed in one-layer diffraction element. In this case, the image light generating device 11 may have one display panel capable of performing color display, or may synthesize image light from three single-color panels of the RGB with a synthesizing prism and output the image light.

The first diffraction element 14 and the second diffraction element 15 are not limited to those formed of the reflection-type holograms, and may be formed of transmission-type holograms.

Figure 5:
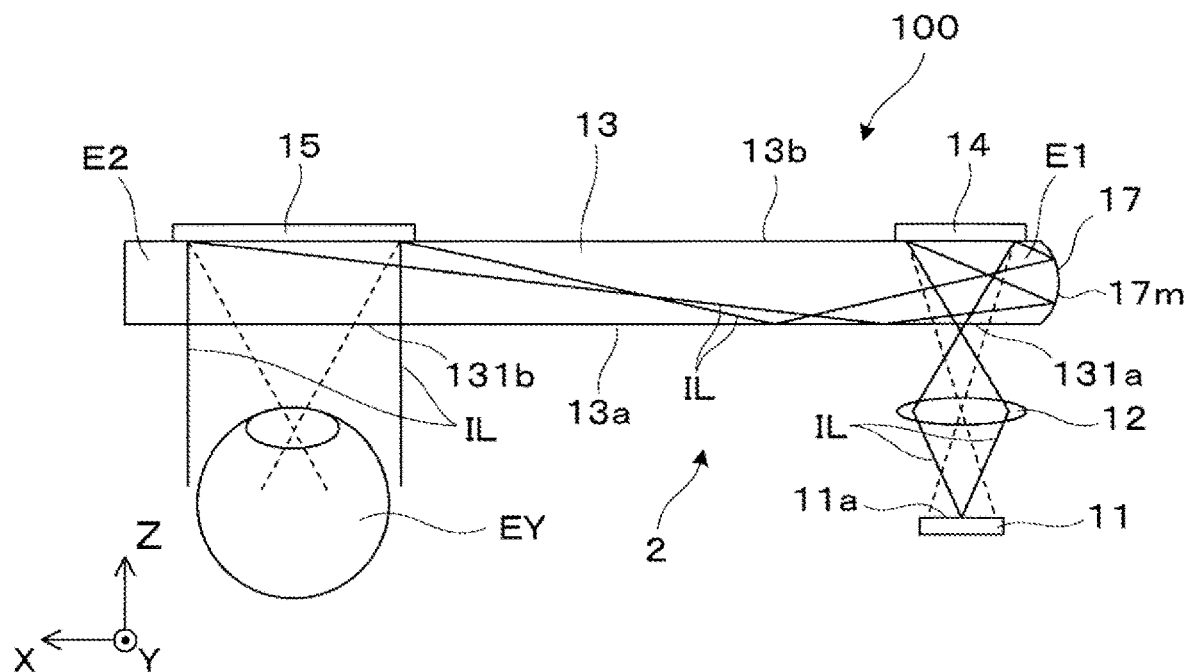
FIG. 5 is a plan sectional view explaining a display device according to a modification example.

In the display device 100 of the above-described embodiment, the image light IL directed from the mirror 17 to the second diffraction element 15 is reflected for a plurality of times by a pair of inner surfaces of the light-guiding member 13, that is, the total reflection surfaces 131*t* and 131*u*. However, as illustrated in FIG. 5, the image light IL directed from the mirror 17 toward the second diffraction element 15 may be reflected only once on the inner surface of the light-guiding member 13.

In the display device 100 of the above-described embodiment, the image light IL is guided by total reflection using a refractive index on the first surface 13*a* and the second surface 13*b* of the light-guiding member 13, and the first surface 13*a* and the second surface 13*a* can be reflective surfaces such as metal mirrors.

Figure 6:
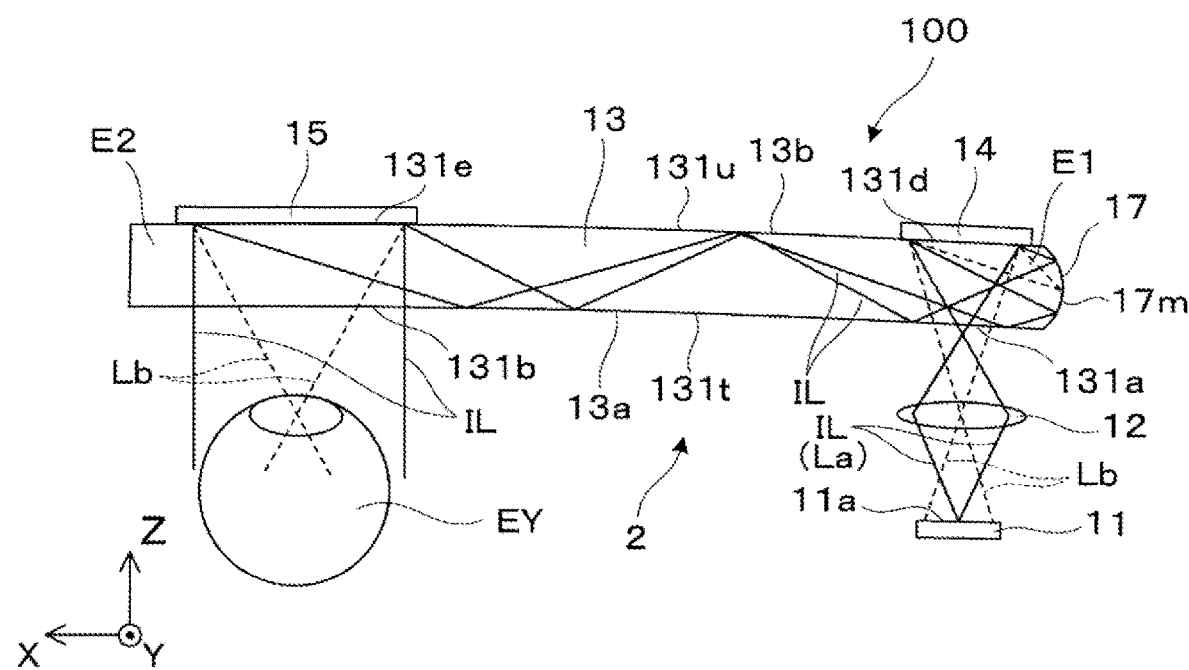
FIG. 6 is a plan sectional view explaining a display device according to a modification example.

The light-guiding member 13 is not limited to a parallel flat plate, and as illustrated in FIG. 6, a slight curvature is allowed. In this case, the light-guiding member 13 curved in a lens shape can be formed to cover the observer's eye EY.

In the display device 100 in the above-described embodiments, a self-luminous type display element such as an organic EL element, LCD, or other light modulation element is used as the image light generating device 11. Instead, a configuration in which a laser scanner obtained by combining a laser light source and a scanner, such as a polygon mirror, may also be used as the image light generating device 11. That is, it is also possible to apply the present disclosure to a laser retinal projection-type head-mounted display.

A light control device that controls light by limiting transmitted light of the second diffraction element 15 may be attached to the external side of the second diffraction element 15. The light control device adjusts a transmittance, for example, electrically. Mirror liquid crystals, electronic shades, electrochromic elements, and the like may be used as the light control device. The light control device may adjust a transmittance according to external light brightness. When the light control device blocks the external light, only a virtual image that is not affected by an external image can be observed. Further, the display device of the present disclosure is applicable to a so-called closed-type head-mounted display device (HMD) that blocks the external light and causes only image light to be visually recognized. In this case, the HMD may also be compatible with a so-called see-through video product constituted of the image display device and an imaging device.

In the above-described embodiment, the display device 100 is incorporated in the HMD 200, but the display device 100 can be incorporated in a head-up display.

The display device according to a specific aspect includes the image light generating device, the light-guiding member on which the image light emitted from the image light generating device is incident, the first diffraction element provided at the incident side of the light-guiding member and having positive power, the second diffraction element provided at the exit side of the light-guiding member and having positive power, and the mirror provided at the end portion at the incident side of the light-guiding member and having positive power, in which the image light that passed through the first diffraction element is reflected by the mirror and propagates in the light-guiding member, and the image light incident on the second diffraction element is deflected by the second diffraction element to form the exit pupil.

In the above-described display device, the function of correcting the image light can be imparted to the mirror arranged between the first diffraction element and the second diffraction element on the optical path. Since the mirror is provided at the end portion at the incident side of the light-guiding member, it is possible to suppress the increase in the thickness of the light-guiding member, and thus the light-guiding member can be easily made into a flat plate shape.

In the specific aspect, the first diffraction element is provided at the external side of the light-guiding member, and the second diffraction element is provided at the external side of the light-guiding member.

In the specific aspect, the image light generating device is arranged at the observer side of the light-guiding member. In this case, the image light generating device is arranged so as not to affect the appearance, and thus it is possible to prevent the design of the display device from being impaired.

In the specific aspect, the first diffraction element is the first volume hologram exposed using the spherical wave and having the an interference fringe having a pitch and an inclination angle varying continuously, and the second diffraction element is the second volume hologram exposed using the spherical wave and having the an interference fringe having a pitch and an inclination angle varying continuously. In this case, the exit direction can be inclined with respect to the incident direction while imparting the diffraction elements desired power.

In the specific aspect, the first diffraction element and the second diffraction element are arranged at conjugate positions. In this case, the light beam can be made incident on the positions corresponding to the interference fringes in the first diffraction element and the second diffraction element, thus the wavelength compensation can be appropriately performed, and consequently luminance unevenness and deterioration of a resolution can be reduced.

In the specific aspect, the intermediate image and the pupil are formed between the first diffraction element and the second diffraction element. In this case, the position of the diffraction element where the light beam impinges can be controlled to perform the wavelength compensation appropriately, and thus it is possible to prevent the light beam from spreading and causing the light-guiding plate to be thick or the second diffraction element to be too large.

The optical unit according to a specific aspect includes the light-guiding member on which the image light is incident, the first diffraction element provided at the incident side of the light-guiding member and having positive power, the second diffraction element provided at the exit side of the light-guiding member and having positive power, and the mirror provided at the end portion at the incident side of the light-guiding member and having positive power, in which the image light that passed through the first diffraction element is reflected by the mirror and propagates in the light-guiding member, and the image light incident on the second diffraction element is deflected by the second diffraction element to form the exit pupil.

In the above-described display device, the function of correcting the image light can be imparted to the mirror arranged between the first diffraction element and the second diffraction element on the optical path. Since the mirror is provided at the end portion at the incident side of the light-guiding member, it is possible to suppress the increase in the thickness of the light-guiding member, and thus the light-guiding member can be easily made into a flat plate shape.

What is claimed is:

1. A display device comprising:
an image light generating device;
a light-guiding member on which image light emitted from the image light generating device is incident;
a first diffraction element provided at an incident side of the light-guiding member and having positive power;
a second diffraction element provided at an exit side of the light-guiding member and having positive power; and
a mirror provided at a convex of an end portion at the incident side of the light-guiding member and having positive power, wherein
the image light that passed through the first diffraction element is reflected by the mirror and propagates in the light-guiding member, and
the image light incident on the second diffraction element is deflected by the second diffraction element forming an exit pupil,
the first diffraction element is a first volume hologram having an interference fringe with a pitch and an inclination angle,
in the first diffraction element, the pitch of the interference fringe at an end portion closer side to the mirror is larger than the pitch of the interference fringe at an end portion farther side from the mirror,
in the first diffraction element, the inclination angle of the interference fringe at the end portion farther side from the mirror is larger than the inclination angle of the interference fringe at the end portion closer side to the mirror,
the second diffraction element is a second volume hologram having an interference fringe with a pitch and an inclination angle,
in the second diffraction element, the pitch of the interference fringe at an end portion closer side to the mirror is larger than the pitch of the interference fringe at an end portion farther side from the mirror, and
in the second diffraction element, the inclination angle of the interference fringe at the end portion farther side from the mirror is larger than the inclination angle of the interference fringe at the end portion closer side to the mirror.

2. The display device according to claim 1, wherein the first diffraction element is provided at an external side of the light-guiding member, and the second diffraction element is provided at the external side of the light-guiding member.

3. The display device according to claim 1, wherein the image light generating device is arranged at an observer side of the light-guiding member.

4. The display device according to claim 1, wherein the first diffraction element and the second diffraction element are arranged at conjugate positions.

5. The display device according to claim 1, wherein an intel mediate image and a pupil are formed between the first diffraction element and the second diffraction element.

6. An optical unit comprising:
a light-guiding member on which image light is incident;
a first diffraction element provided at an incident side of the light-guiding member and having positive power;
a second diffraction element provided at an exit side of the light-guiding member and having positive power; and
a mirror provided at a convex of an end portion at the incident side of the light-guiding member and having positive power, wherein
the image light that passed through the first diffraction element is reflected by the minor and propagates in the light-guiding member, and
the image light incident on the second diffraction element is deflected by the second diffraction element forming an exit pupil,
the first diffraction element is a first volume hologram exposed using a spherical wave and having an interference fringe with a pitch and an inclination angle varying continuously,
in the first diffraction element, the pitch of the interference fringe at an end portion closer side to the mirror is larger than the pitch of the interference fringe at an end portion farther side from the mirror,
in the first diffraction element, the inclination angle of the interference fringe at the end portion farther side from the mirror is larger than the inclination angle of the interference fringe at the end portion closer side to the mirror,
the second diffraction element is a second volume hologram exposed using the spherical wave and having an interference fringe with a pitch and an inclination angle varying continuously, in the second diffraction element, the pitch of the interference fringe at an end portion closer side to the mirror is larger than the pitch of the interference fringe at an end portion farther side from the mirror, and in the second diffraction element, the inclination angle of the interference fringe at the end portion farther side from the mirror is larger than the inclination angle of the interference fringe at the end portion closer side to the minor.

* * * * *